Patented Aug. 14, 1934

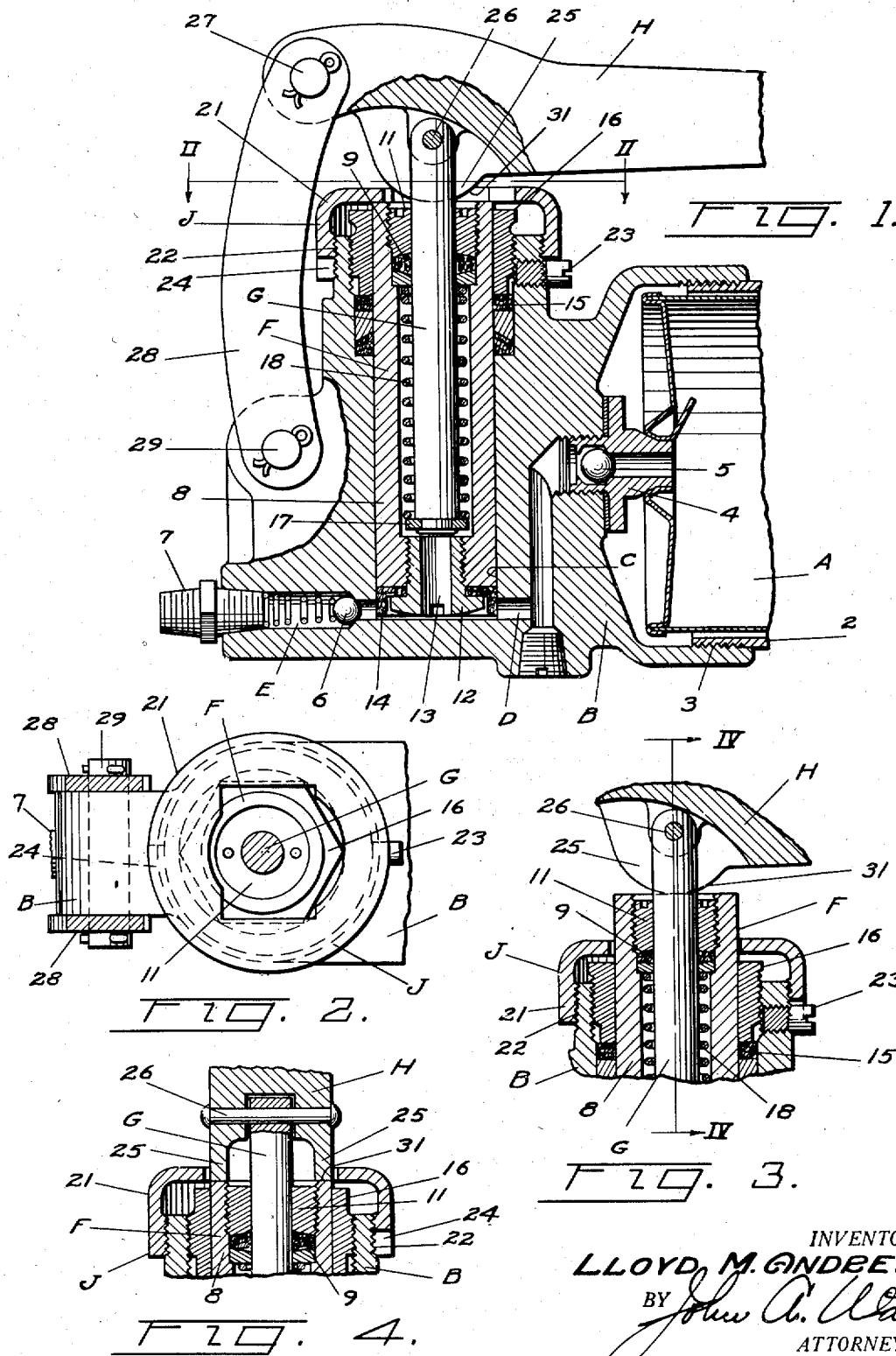

1,969,920

UNITED STATES PATENT OFFICE 1,969,920

LUBRICATION DEVICE

Lloyd M. Andrews, South Bend, Ind., assignor to The Lubrication Corporation, South Bend, Ind., a corporation of Delaware Application July 22, 1932, Serial No. 623,940

10 Claims. (Cl. 221—47.3)

This invention relates to improvements in lubrication devices and more particularly to hand operated lubricant guns such as employed to service lubricant receiving fittings on automobile chassis and various types of machinery.

Under ordinary conditions lubricant may be discharged into a lubricant receiving nipple or fitting to the bearing or other parts associated therewith under relatively low pressures and it is therefore desirable in constructing hand pumps to provide relatively large piston displacement to take advantage of the low operating pressures required and thus increase efficiency in operation by increasing the amount of lubricant delivered at each pressure stroke of the hand operated piston actuator. With increased piston displacement, however, the manual force required to operate the pump to produce relatively high pressures is so increased as to render the use of the pump impractical.

An object of the invention is to provide a hand operated lubricant pump operable at will to deliver large quantities of lubricant under relatively low pressures or small quantities of lubricant under relatively high pressures within a common range of applied manual force.

A further object is to provide a lubricant pump as described wherein force is accumulated during the return piston stroke of the high pressure pumping cycle and applied to augment piston movement during the pressure stroke of the pumping cycle.

Another object is to provide a lubricant pump having two pistons, one having a greater displacement than the other and means for selectively reciprocating one or both of the pistons to vary the quantity of lubricant discharged from the pump during each pressure stroke of the pumping cycle.

Other objects, the advantages and uses of the invention, will be, or should become apparent after reading the following description and claims and after consideration of the accompanying drawing forming a part of this specification, in which:

Fig. 1 is a sectional view through the pump mechanism of a hand lubricant gun constructed in accordance with the invention with its low pressure piston locked;

Fig. 2 is a sectional view along the line II—II of Fig. 1;

Fig. 3 is a fragmentary sectional view illustrating the low pressure piston released for operation; and Fig. 4 is a sectional view along the line IV—IV of Fig. 3.

In general, the hand operated lubricant gun selected for illustration herein is of the hand lever type and comprises a lubricant cartridge A providing a source of lubricant supply supported upon the body B of the gun, a pump cylinder C, formed in the body B, having an inlet port D and a discharge port E, a low pressure piston F and a high pressure piston G disposed within the cylinder C, a hand lever H for operating the pistons and locking means J operable at will for restraining the low pressure piston against operative movement in the cylinder B.

Referring to the drawing, the cartridge A is disposed within a detachable casing 2 secured to the body B of the pump by screw threads 3. Communication between the cartridge A and the inlet port D of the pump is established through the medium of a cartridge connector stud 4 incorporating a ball check valve 5. A coupling member 7 is provided for connecting the discharge port E with a discharge conduit and dispensing nozzle, not shown.

The low pressure piston F is formed of a tubular member 8 closed at its upper end by a packing assembly 9 and threaded bushing 11 through which the high pressure piston G extends. The lower end of the tubular member 8 has a screw 12 secured therein having a passage 13 extending therethrough which passage serves to conduct lubricant to and from the high pressure cylinder formed by the bore of the tubular member 8. The screw 12 serves also as a means for securing a cup leather packing member 14 engageable with the walls of the cylinder C to the low pressure piston F. A packing assembly 15 and bushing 16 is located at the upper end of the cylinder C to form a packing for the upper end of the cylinder engageable with the outer walls of the low pressure piston F. The low pressure piston, when at the limit of its pressure stroke, extends slightly above the upper end of the bushing 16 as shown in Fig. 1. The lower end of the high pressure piston G has a washer 17 secured thereto upon which one end of a compression spring 18 bears. The spring 18 is disposed about the high pressure piston G and bears at its opposite end upon the inner end of the packing assembly 9. Unless the low pressure piston F is restrained against movement therefor, elevation of the high pressure piston G will result in the low pressure piston moving therewith through the medium of the spring 18. When the low pressure piston is restrained from movement, as by operation of the locking means J, the spring 18 will become compressed upon elevation of the high pressure piston as during a return stroke, thereby accumulating force to augment the force applied in producing the next successive pressure stroke of the high pressure piston.

The restraining or locking means J comprises an apertured cap 21 engageable by cooperating screw threads 22 with the body B of the pump. A stud screw 23 fixed to the body B and extending within a cut-away portion 24 of the skirt of the cap serves to maintain rotational movement of the cap within a range of 180°. When the cap 21 is in the position shown in Figs. 1 and 2, the piston F is locked against movement outwardly of the cylinder C. When rotated to the position shown in Figs. 3 and 4, however, the piston F is free to move outwardly of the cylinder C due to alignment of the aperture, through the cap, with the cylinder. With the locking means J set to the position shown in Figs. 3 and 4, the spring 18 urges the piston F upwardly until the end of the tubular member 8, forming a part of the piston, engages at diametrically opposite sides with a pair of spaced apart lugs 25 formed on the lever H extending downwardly on opposite sides of the upper end of the piston G below its pivotal connection 26 therewith. The inner end of the lever H is pivotally connected at 27 to a pair of links 28, which in turn, are pivoted at 29 upon the body B of the pump. The piston contacting walls 31 of the lugs 25 are concentric to the axis of the pivotal connection 26 between the piston G and the hand lever H so as to bear uniformly upon the piston F during the operation of the lever H without causing relative movement between the pistons F and G.

In operation, for most lubricant servicing duties, the locking means J is set to the position shown in Figs. 3 and 4 whereupon operation of the lever H may result in the reciprocation of the pistons F and G as a unit in the cylinder C to displace and discharge relatively large quantities of lubricant. If, however, relatively high pressures are needed to discharge lubricant into the lubricant receiving bearing or other machinery parts with which the pump is connected, it may be found that the manual effort required to produce a pressure stroke of the pistons F and G is greater than that of which the operator is capable of applying.

Under the latter condition, the operator may move the pistons to the full limit of their pressure stroke and rotate the locking means J to the position shown in Figs. 1 and 2 to restrain the piston G against movement outwardly of the cylinder B. Reciprocation of the piston G through operation of the lever H may thereupon displace relatively small quantities of lubricant through the discharge port E under high pressure, the pressure stroke of the piston G being augmented by force accumulated in the spring 18 during the next preceding return stroke of the piston.

It is to be understood that the described embodiments of the invention herein set forth are presented for the purpose of illustration only, and various changes may be made therein without departing from the spirit and scope of the invention.

I claim:

1. A lubricant pump comprising, a pump cylinder, a pair of pistons mounted for reciprocation within said cylinder, positive means for moving both of said pistons during their pressure stroke in said cylinder and for returning one of said pistons, and yielding means for causing the other piston to return with the first named piston.

2. A lubricant pump comprising, a pump cylinder, a pair of pistons mounted for reciprocation within said cylinder, positive means for moving both of said pistons during their pressure stroke in said cylinder and for returning one of said pistons yielding means for causing the other piston to return with the first named piston, and means operable at will to lock said second named piston against movement with said first named piston.

3. A lubricant pump comprising, a pump cylinder, a pair of pistons mounted for reciprocation within said cylinder, positive means for moving both of said pistons during their pressure stroke in said cylinder and for returning one of said pistons, yielding means for causing the other piston to return with the first named piston, and means operable at will to lock said second named piston against movement within said cylinder regardless of the movement of said first named piston.

4. A lubricant pump comprising, a pump cylinder, a pair of pistons within said cylinder, means for reciprocating one of said pistons, positive means for causing the other piston to follow said first named piston on its pressure stroke, and yielding means interconnecting said pistons and effective yieldingly to urge said last named piston to follow said first named piston during its return stroke.

5. A lubricant pump comprising, a pump cylinder, a pair of pistons within said cylinder, means for reciprocating one of said pistons, positive means for causing the other piston to follow said first named piston on its pressure stroke, means interconnecting said piston and effective yielding to urge said last named piston to follow said first named piston during its return stroke, and means operable at will to restrain said second named piston against movement relative to said cylinder.

6. A lubricant pump comprising, a pump cylinder having an inlet and an outlet port, a low pressure piston mounted for reciprocation in said cylinder, a high pressure piston mounted for reciprocation along the axis of said low pressure piston, piston operating means coupled directly to said high pressure piston, yieldable means associated with said pistons for urging said low pressure piston into operative engagement with said piston operating means, and positive means operable at will to restrain said low pressure piston against movement relative to said cylinder.

7. A lubricant pump comprising, a pump cylinder having an inlet and an outlet port, a pair of pistons disposed in said cylinder, one of which has a greater displacement than the other, a member connected to said piston of lesser displacement for reciprocating said piston, means for establishing positive and direct engagement between said member and said piston of greater displacement during one half of the pumping cycle and for establishing a yielding connection therebetween through said piston of lesser displacement during the other half of said pumping cycle.

8. A lubricant pump comprising, a pump cylinder having an inlet and an outlet port, a pair of pistons disposed in said cylinder, one of which has a greater displacement than the other, a member connected to said piston of lesser displacement for reciprocating said piston, means for establishing positive and direct engagement between said member and said piston of greater displacement during one half of the pumping cycle and for establishing a yielding connection therebetween during the other half of said pumping cycle.

9. A lubricant pump comprising, a pump cylinder, a pair of pistons mounted for reciprocation within said cylinder in telescopic relationship, positive means for moving both of said pistons during their pressure stroke in said cylinder and for returning one of said pistons, means operable at will to lock the other piston against movement within said cylinder, and a spring interconnecting said pistons adapted to store up kinetic energy during the return movement of the first named piston for use in the next succeeding pressure stroke thereof when the second named piston is secured against movement by said locking means.

10. A lubricant pump comprising, a pump cylinder having an inlet and an outlet port, a pair of pistons disposed in said cylinder one of which has a greater displacement than the other, a member connected to said piston of lesser displacement for reciprocating said piston, means for establishing positive and direct engagement between said member and said piston of greater displacement during one-half of the pumping cycle, means for locking said piston of greater displacement against movement in said cylinder at will, and means operable upon the movement of said piston of lesser displacement at such times as when the other piston is locked within the cylinder for storing up kinetic energy during the retractile movement of the piston of lesser displacement and for returning said energy during the next successive power stroke of the piston, said means also acting yieldingly to interconnect the two pistons during the retracitle movement of said member, at such times as when the said locking means is ineffective.

LLOYD M. ANDREWS.

CERTIFICATE OF CORRECTION.

Patent No. 1,969,920.                                August 14, 1934.

LLOYD M. ANDREWS.

It is hereby certified that error appears in the printed specification of the above numbered patent requiring correction as follows: Page 2, line 16, for "cylnder" read cylinder; line 84, claim 2, after "pistons" insert a comma; line 114, claim 5, before "means" insert yeilding; and for "piston" read pistons; and line 115, same claim, for "yeilding" read yeildingly; and that the said Letters Patent should be read with these corrections therein that the same may conform to the record of the case in the Patent Office.

Signed and sealed this 5th day of November, A. D. 1935.

Leslie Frazer
Acting Commissioner of Patents.

(Seal)

between said member and said piston of greater displacement during one half of the pumping cycle and for establishing a yielding connection therebetween during the other half of said pumping cycle.

9. A lubricant pump comprising, a pump cylinder, a pair of pistons mounted for reciprocation within said cylinder in telescopic relationship, positive means for moving both of said pistons during their pressure stroke in said cylinder and for returning one of said pistons, means operable at will to lock the other piston against movement within said cylinder, and a spring interconnecting said pistons adapted to store up kinetic energy during the return movement of the first named piston for use in the next succeeding pressure stroke thereof when the second named piston is secured against movement by said locking means.

10. A lubricant pump comprising, a pump cylinder having an inlet and an outlet port, a pair of pistons disposed in said cylinder one of which has a greater displacement than the other, a member connected to said piston of lesser displacement for reciprocating said piston, means for establishing positive and direct engagement between said member and said piston of greater displacement during one-half of the pumping cycle, means for locking said piston of greater displacement against movement in said cylinder at will, and means operable upon the movement of said piston of lesser displacement at such times as when the other piston is locked within the cylinder for storing up kinetic energy during the retractile movement of the piston of lesser displacement and for returning said energy during the next successive power stroke of the piston, said means also acting yieldingly to interconnect the two pistons during the retractile movement of said member, at such times as when the said locking means is ineffective.

LLOYD M. ANDREWS.

CERTIFICATE OF CORRECTION.

Patent No. 1,969,920.　　　　　　　　　　　　　　　　　August 14, 1934.

LLOYD M. ANDREWS.

It is hereby certified that error appears in the printed specification of the above numbered patent requiring correction as follows: Page 2, line 16, for "cylnder" read cylinder; line 84, claim 2, after "pistons" insert a comma; line 114, claim 5, before "means" insert yeilding; and for "piston" read pistons; and line 115, same claim, for "yeilding" read yeildingly; and that the said Letters Patent should be read with these corrections therein that the same may conform to the record of the case in the Patent Office.

Signed and sealed this 5th day of November, A. D. 1935.

Leslie Frazer
　　　　　　　　　　　　　　　　　　　Acting Commissioner of Patents.

(Seal)